United States Patent
Harmon

(10) Patent No.: US 7,594,485 B2
(45) Date of Patent: Sep. 29, 2009

(54) VALVE ACTUATION SYSTEM FOR INTERNAL COMBUSTION ENGINE

(75) Inventor: Michael P. Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 325 days.

(21) Appl. No.: 11/645,158

(22) Filed: Dec. 26, 2006

(65) Prior Publication Data

US 2008/0149053 A1   Jun. 26, 2008

(51) Int. Cl.
*F01L 1/34* (2006.01)
(52) U.S. Cl. .................. 123/90.15; 123/90.12; 123/347
(58) Field of Classification Search .............. 123/90.12, 123/90.13, 90.15, 90.17, 90.16, 90.18, 90.27, 123/90.31, 345, 346, 347, 348, 568.11, 568.15; 60/605.2
See application file for complete search history.

(56) References Cited

U.S. PATENT DOCUMENTS

| | | | |
|---|---|---|---|
| 3,220,392 A | 11/1965 | Cummins | |
| 4,510,900 A | 4/1985 | Quenneville | |
| 5,398,502 A | 3/1995 | Watanabe | |
| 6,105,555 A | 8/2000 | Weber et al. | |
| 6,266,957 B1 | 7/2001 | Nozawa et al. | |
| 6,360,531 B1 | 3/2002 | Wiemero et al. | |
| 6,502,535 B2 | 1/2003 | Nakamura | |
| 6,564,763 B2 | 5/2003 | Shiraishi et al. | |
| 6,651,601 B2 | 11/2003 | Sun et al. | |
| 6,729,126 B2 | 5/2004 | Ogiso et al. | |
| 2004/0194448 A1 | 10/2004 | Tokuyasu et al. | |
| 2005/0000480 A1 | 1/2005 | Yasui et al. | |
| 2005/0000499 A1 | 1/2005 | Ruggiero et al. | |
| 2006/0054119 A1 | 3/2006 | Robinson | |
| 2006/0130459 A1 | 6/2006 | Warner et al. | |

FOREIGN PATENT DOCUMENTS

| | | |
|---|---|---|
| DE | 10210550 | 9/2003 |
| EP | 0 826 870 A2 | 3/1998 |
| EP | 1 493 908 A2 | 1/2001 |
| EP | 1186752 | 3/2002 |
| FR | 2836514 | 8/2003 |
| JP | 07 197826 A | 8/1995 |
| WO | WO 03/064820 | 8/2003 |

OTHER PUBLICATIONS

PCT International Search Report, Applicant's Ref. No. 06-338; PCT/US2007/025259; Filing Date: Dec. 11, 2007; Applicant: Caterpillar Inc.

*Primary Examiner*—Ching Chang
(74) *Attorney, Agent, or Firm*—Finnegan, Henderson, Farabow, Garrett & Dunner

(57) ABSTRACT

A valve actuation system for an engine is provided. The valve actuation system can include two or more engine cylinders, each cylinder having at least one intake valve configured to control air-flow into each of the two or more cylinders and at least one exhaust valve configured to control the flow of exhaust gases out of each of the two or more cylinders. The at least one first cylinder includes an exhaust cam lobe configured to control the valve timing of an exhaust valve of the at least one first cylinder and to cause an exhaust valve of a second cylinder to open during an expansion stroke of the second cylinder.

17 Claims, 3 Drawing Sheets

VALVE ACTUATION SYSTEM FOR INTERNAL COMBUSTION ENGINE

TECHNICAL FIELD

The present disclosure pertains to internal combustion engines, and more particularly, to internal combustion engines with early-opening valve actuation systems.

BACKGROUND

Control of engine valve timing can be important for improving engine performance and facilitating a variety of other machine operations. For example, proper valve timing can help improve engine power output and fuel efficiency. Further, variable valve timing can be used to facilitate other machine operations such as braking of highway vehicles and control of exhaust system operation through regulation of combustion byproduct production and/or control of exhaust system temperature.

Generally, engine valve timing is selected to optimize certain engine performance parameters such as power output, fuel efficiency, and/or exhaust emissions. However, to facilitate machine operations such as braking or control of exhaust temperature, it may be desirable to change valve timing only when these operations are desired. For example, elevated exhaust temperature may be periodically needed to regenerate diesel particulate filters (DPFs). However, since the production of hot exhaust gases may decrease power output and/or fuel efficiency, it would be beneficial to have a valve actuation system that can switch to a hot, DPF regeneration mode periodically and temporarily when needed.

One valve-timing control system is described in U.S. Pat. No. 6,564,763, which issued to Shiraishi on May 20, 2003 (hereinafter the '763 patent). The '763 patent includes an engine and control mechanism for varying the opening and closing time of intake and exhaust valves. Further, the '763 patent provides methods for heating cold catalysts by controlling valve timing.

Although the system of the '763 patent may provide suitable valve timing control for many engines, the system of the '763 patent may have some drawbacks. For example, the '763 patent does not provide systems or methods for alternatively selecting valve timing to effect braking or exhaust gas heating as desired. Further, the system of the '763 patent includes an electronic valve control mechanism but does not provide a method for ensuring consistent valve timing and optimum performance.

The present disclosure is directed towards overcoming one or more of the shortcomings of the prior art variable valve timing systems.

SUMMARY OF THE INVENTION

A first aspect of the present disclosure includes a valve actuation system for an engine. The valve actuation system can include two or more engine cylinders, each cylinder having at least one intake valve configured to control air-flow into each of the two or more cylinders and at least one exhaust valve configured to control the flow of exhaust gases out of each of the two or more cylinders. At least one first cylinder includes an exhaust cam lobe configured to selectively control the valve timing of an exhaust valve of the at least one first cylinder and to cause an exhaust valve of a second cylinder to open during an expansion stroke of the second cylinder.

A second aspect of the present disclosure includes a method for controlling engine valve timing. The method can include operating an engine including two or more engine cylinders each cylinder having at least one intake valve configured to control air-flow into each of the two or more cylinders and at least one exhaust valve configured to control the flow of exhaust gases out of each of the two or more cylinders. The method may further include selecting an exhaust cam lobe of at least one first cylinder wherein the at least one first cylinder has an exhaust stroke timing that overlaps with the power stroke of the at least one second cylinder, and opening the at least one exhaust valve of the at least one second cylinder by coupling the exhaust valve of the at least one second cylinder to the exhaust cam lobe of the at least one first cylinder such that the exhaust valve opens during a power stroke of the at least one second cylinder.

A third aspect of the present disclosure includes an exhaust system heating and machine braking system. The system can include two or more engine cylinders, each cylinder having at least one intake valve configured to control air-flow into each of the two or more cylinders and at least one exhaust valve configured to control the flow of exhaust gases out of each of the two or more cylinders. At least one first cylinder includes an exhaust cam lobe configured to selectively control the valve timing of an exhaust valve of the at least one first cylinder and to cause an exhaust valve of a second cylinder to open during an expansion stroke of the second cylinder. The system can further include a machine electrical control system configured to couple and decouple the exhaust cam lobe of the at least one cylinder and the exhaust valve of the second cylinder to activate and deactivate an early exhaust valve timing mode.

DETAILED DESCRIPTION

Figure 1:
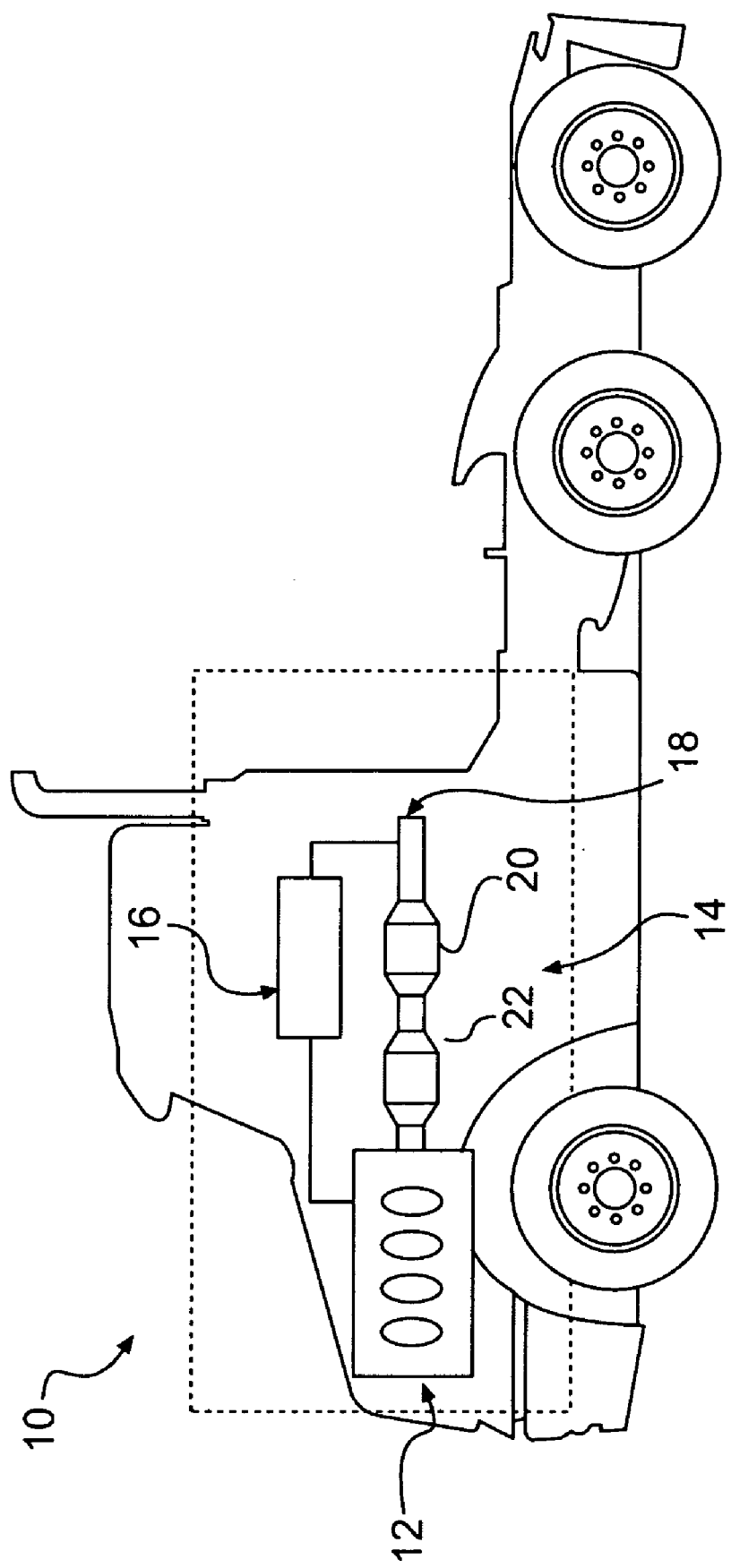
FIG. 1 illustrates a machine including an engine and a valve actuation system, according to an exemplary embodiment.

FIG. 1 illustrates a machine 10 including an engine 12 and a valve actuation system, according to an exemplary embodiment. As described in detail below, the valve actuation system can provide variable valve timing to facilitate various machine operations. For example, as shown, machine 10 is a highway truck that includes an exhaust system 14 fluidly connected to engine 12 to receive exhaust gases produced by engine 12 and, among other functions, to control emissions of exhaust species produced by engine 12. In some embodiments, the valve actuation system of the present disclosure may be configured to control the temperature of exhaust gases produced by engine 12 to improve the performance of one or more components of exhaust system 14. In other embodiments, the valve actuation system of the present disclosure may be configured to facilitate truck braking by early exhaust valve opening. Further, in some embodiments, the valve actuation system of the present disclosure may include mechanisms for selecting desired valve timing modes based on desired machine performance.

Exhaust system 14 can include a number of different exhaust system components. For example, exhaust system 14 can include one or more exhaust passages 18 configured to receive exhaust gases produced by engine 12. Further, exhaust system 14 may include one or more catalysts 20 and/or filters 22 fluidly coupled to exhaust passage 18 such that exhaust gases flowing through passage 18 may be passed through various exhaust system components to facilitate removal of various exhaust gas pollutants (e.g. NOx and particulate matter).

Catalysts 20 and filter 22 can include a number of suitable catalysts and/or filter types and configurations. For example, suitable catalysts can include selective catalytic reduction catalysts that are configured to remove NOx from exhaust gases by reaction with a reductant such as ammonia. Other suitable catalysts can include, for example, NOx-adsorbers, three-way catalysts, oxidation catalysts, and/or any other suitable catalyst type as is known in the art. Further, suitable catalysts can include a range of different substrate and/or wash coat materials, as well as a variety of suitable sizes and configurations.

Likewise, filter 22 can include a variety of suitable filters. For example, highway trucks may commonly include a particulate filter to control emissions of diesel particulate matter. Therefore, filter 22 can include one or more diesel particulate filters (DPFs) that may be positioned upstream and/or downstream of other exhaust system components.

It should be noted that exhaust system 14 may further include a number of other additional components. For example, although the system shown in FIG. 1 includes a single filter 22 and catalyst 20, it will be understood that exhaust system 14 may commonly include a number of additional filters and/or catalysts. Further, system 14 can include additional exhaust system components, including for example, additional sensors, energy-producing systems, exhaust additive systems, mixing systems, and/or any other suitable device.

In some embodiments, machine 10 may further include a machine electrical control unit 16 (ECU). Machine ECU 16 may be configured to monitor the operation of engine 12 and/or exhaust system 14 through various sensors (e.g gas sensors, pressure sensors, speedometers). In addition, ECU 16 may control and coordinate various machine operations to improve machine performance based on varying operational demands. In one embodiment, ECU 16 may form part of a machine valve actuation control system, as described below.

As noted previously, the valve actuation system of the present disclosure can selectively control valve timing to facilitate various machine operations. In some embodiments, the valve actuation system of the present disclosure may control exhaust valve opening to produce hotter than normal exhaust gases. For example, in one embodiment, one or more cylinder exhaust valves can open during an engine expansion (power) stroke before the gases within the cylinder have fully expanded after combustion. Since expansion of any gases will cause the gas to cool, by allowing the exhaust gases to escape through the exhaust valve before expansion is complete, the exhaust gases will be hotter than exhaust gases released after more complete expansion within the cylinder. In addition, generally, since early valve opening will producing a low power output that can be used to move a vehicle, more fuel will be used during early valve opening, thereby further increasing the temperature of exhaust gases during an earlier valve opening mode.

In some embodiments, the hotter exhaust gases may be used to control one or more exhaust system operations. For example, in one embodiment, the hot exhaust gases will heat a DPF, thereby facilitating filter regeneration. In other embodiments, the exhaust gas temperature will be selected to control the temperature of one or more downstream catalysts, as for example, after a cold start, during operation in cold ambient environments, and/or any time heating is needed to optimize or control the catalytic activity of one or more catalysts.

Figure 2:
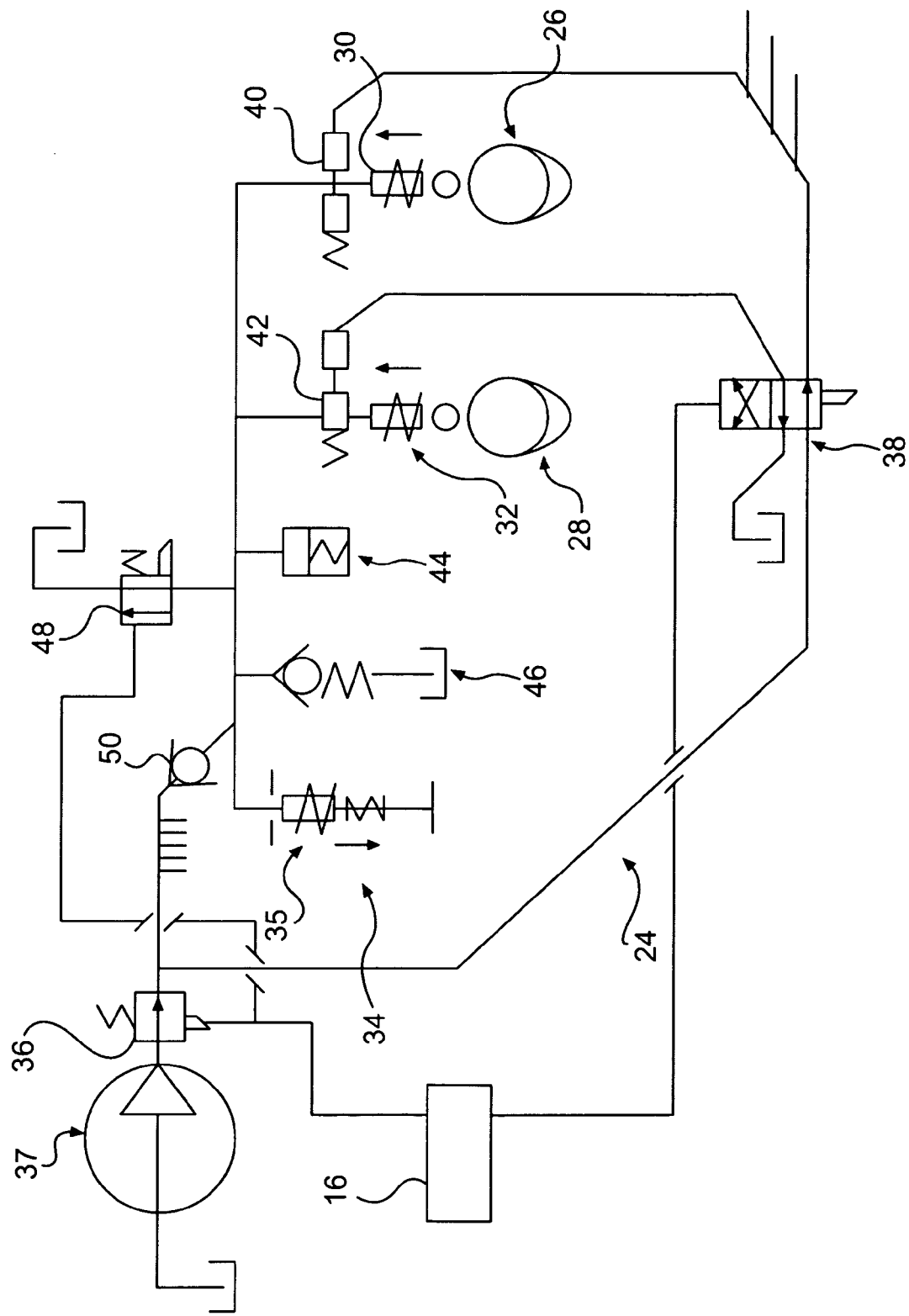
FIG. 2 provides a schematic diagram of a valve actuation system, according to an exemplary embodiment.

FIG. 2 provides a schematic diagram of a valve actuation system 24, according to an exemplary embodiment. In some embodiments, actuation system 24 can include a master-slave control system whereby the valve timing for one cylinder is tied to the timing of another engine event. For example, in some embodiments, in order to facilitate early valve opening to produce hot exhaust gases, the exhaust valve timing of a one (slave) cylinder may be selectively coupled to an exhaust cam lobe of another (master) cylinder. Further, in other embodiments, in order to facilitate engine braking via early valve opening, the exhaust valve timing of a cylinder may be coupled to the injector cam timing of the same cylinder to open the exhaust valve of the same cylinder during a compression stroke of that cylinder, as described in detail below.

Exhaust valve timing can be controlled in a number of different ways. For example, valve opening and closing is typically effected by movement of one or more cams associated with a particular cylinder, and generally, a cam configured to effect valve opening and closing for a particular cylinder will be located in a predicted position with respect to the cylinder (e.g. directly above the cylinder for an in-line engine). However, the valve timing for any particular cylinder is dictated by the shape of the cam lobes, and to vary an engine's valve timing, a limited number of options are available based on the cam design. For example, some systems can advance the timing of one or more valves by rotating the cam lobes to a new earlier position. In addition, more complicated cams may have variable lobe shapes that can be selected as desired.

The present disclosure provides a system for selectively and/or temporarily varying the valve timing of one or more exhaust valves by selectively tying the valve opening timing with another engine event. In one embodiment, at least one first exhaust cam 26 of one cylinder may selectively control that the valve timing of a second cylinder exhaust valve 34. Further, the opening timing of second cylinder exhaust valve 34 may be selectively and/or temporarily dependent upon the position of first cylinder exhaust cam 26 such that the exhaust valve 34 of a second cylinder will open during an exhaust stroke of the first cylinder. In addition, in some embodiments, first cylinder cam 26 and second cylinder exhaust valve 34 may be selected such that the opening timing of second cylinder exhaust valve 34 will occur during an expansion stroke of a cylinder associated with exhaust valve 34, thereby allowing exhaust gases within the cylinder to escape into exhaust system 14 relatively earlier than would be normally desired and producing relatively hot exhaust gases.

In some embodiments, the first cylinder exhaust cam 26 will be operatively coupled to a master piston 30. Further, master piston 30 may be selectively coupled to a second slave piston 35, and slave piston 35 will be configured to cause opening of exhaust valve 34, such that displacement of master piston 30 by exhaust cam 26 will effect opening of exhaust valve 34 during an expansion stroke of a corresponding cylinder.

In some embodiments, valve actuation system 24 may be configured to alternatively select one or more valve timing modes, and in some embodiments, the selected valve timing mode will be based on a selected master cylinder. In one timing mode, as described above, the exhaust valve timing of the slave cylinder will be selected to allow early valve opening during a cylinder expansion stroke. In another embodiment, the valve timing will be selected to provide exhaust valve opening during an engine compression stroke (i.e. before TDC) to effect vehicle braking.

The braking timing mode can be effected by selecting an injector cam lobe 28 associated with a second master piston 32 that will allow a hydraulic valve actuation system to open one or more engine exhaust valves during an engine compression stroke. For some engine designs, the injector cam of a cylinder will have appropriate timing to allow the injector cam to act as the master for the exhaust valve of the same cylinder, thereby allowing the exhaust valve to open before TDC to facilitate machine braking. Therefore, in some embodiments, master piston 32 will include an injector cam lobe 28 that will control the timing of the exhaust valve of the same cylinder (shown schematically as the slave piston 35 in FIG. 2). In this embodiment, injector cam 28 may be operatively coupled to a second master hydraulic piston 32 such that injector cam 28 can displace master piston 32. In addition, since the injector cam timing for a cylinder may have a timing that overlaps with the compression stroke of the same cylinder, master piston 32 may be selectively coupled to the slave piston 35, and slave piston 35 may be configured to cause an exhaust valve 34 of the same cylinder to open such that displacement of master piston 32 by injector cam 28 will effect opening of exhaust valve 34 during a compression stroke of the cylinder.

In order to selectively control valve timing, valve actuation system 24 may include one or more hydraulic control system components that will allow early exhaust valve opening of selected cylinders when desired. Generally, the hydraulic control system components will include at least one fluid pump 37 configured to supply hydraulic fluid to valve control mechanisms. In addition, in some embodiments, valve actuation control system 37 may include a system on/off fill control valve 36, which may enable/disable the variable valve timing systems of the present disclosure. Further, in some embodiments, valve actuation control system 24 will include a master cylinder selection control mechanism 38 to allow selection of desired master-slave relationships, and thereby allow selection of a desired valve timing mode.

Master cylinder selection control mechanism 38 can operate in a variety of ways. For example, master cylinder selection control mechanism 38 can include a fluid flow control system to selectively control the flow of hydraulic fluid to one or more exhaust or intake valves. Further, master cylinder selection control mechanism 38 can be configured to select a desired master cylinder having a cam lobe configured to control the exhaust valve timing of one or more other cylinders and/or the same cylinder. Further, the master and slave cylinders can be selected and changed to allow switching between two or more different valve timing modes based on desired machine operation. These timing modes can include a normal engine timing mode selected to produce desired fuel efficiency and power output, a braking mode, and a hot exhaust gas producing mode.

In some embodiments, master cylinder selection control mechanism 38 will control one or more hydraulic valves 40, 42 through which hydraulic fluid must flow in order to activate a valve opening or closing operation. For example, as shown in the schematic diagram of FIG. 2, valves 40, 42 include spool valves associated with alternative master hydraulic pistons 30, 32. If and when either valve 40 or valve 42 is open, hydraulic fluid supplied by pump 37 will be able to flow through hydraulic circuits coupled with master pistons 30, 32, thereby enabling either master piston 30 or master piston 32 to provide desired valve timing.

Figure 3:
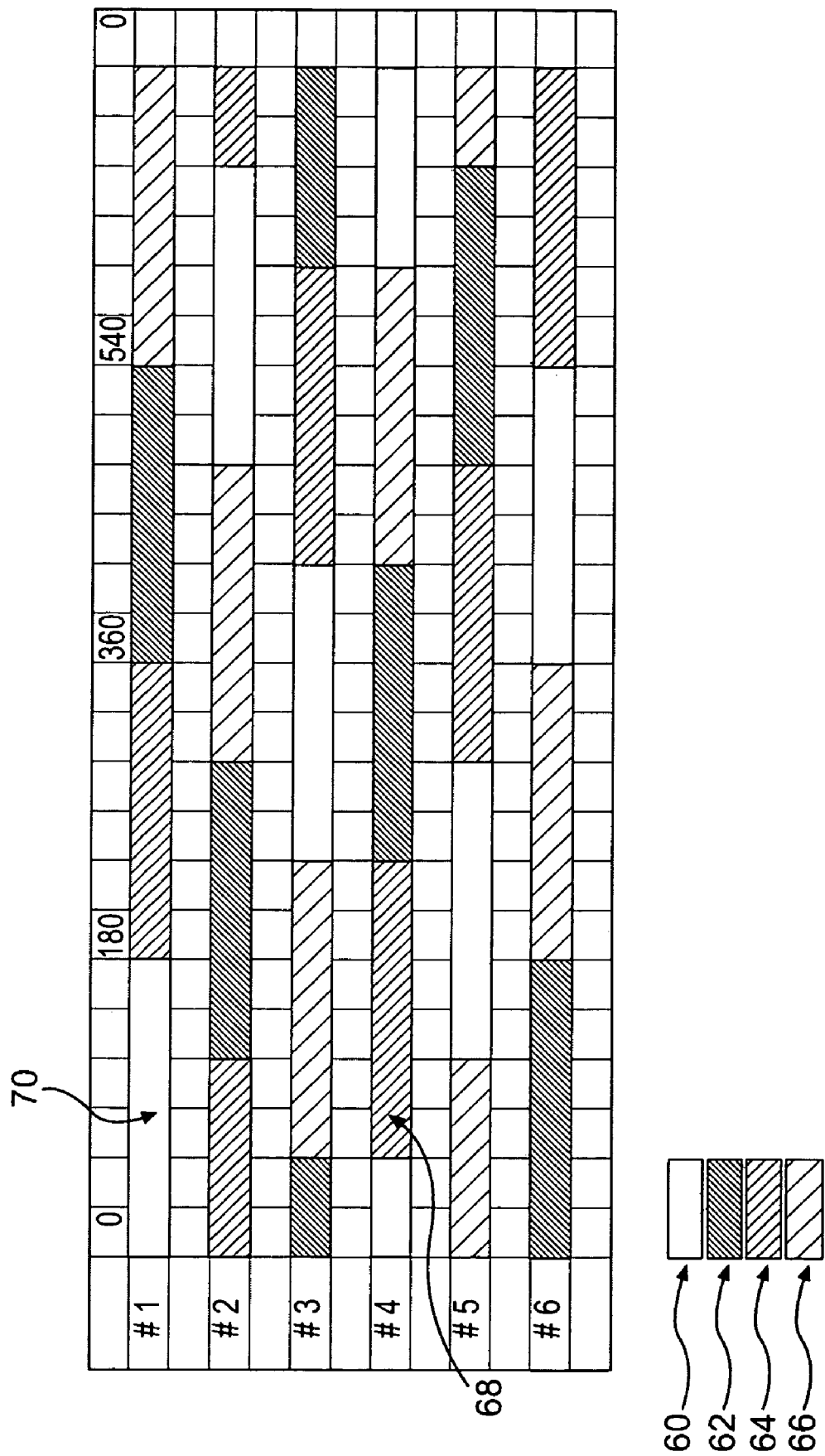
FIG. 3 illustrates relative stroke cycle timing for a six-cylinder, four-stroke engine that may include a valve actuation system of the present disclosure.

FIG. 3 illustrates relative stroke cycle timing for a six-cylinder, four-stroke engine that may include a valve actuation system of the present disclosure. For each engine cylinder (#1-#6), the timing of a power stroke 60, an intake stroke 62, an exhaust stroke 64, and a compression stroke 66 is illustrated. Further, for a typical six-cylinder engine, the exhaust stroke of one cylinder will overlap with the expansion/power stroke of another cylinder. For example, as shown, an exhaust stroke 68 of cylinder #4 overlaps with a power stroke 70 of cylinder #1. Likewise, it will be appreciated that the exhaust stroke of cylinder #6 overlaps with the timing of the power stroke of cylinder #2, the exhaust stroke of cylinder #5 overlaps with the timing of the power stroke of cylinder #3, the exhaust stroke of cylinder #2 overlaps with the timing of the power stroke of cylinder #4, the exhaust stroke of cylinder #1 overlaps with the timing of the power stroke of cylinder #5, and the exhaust stroke of cylinder #3 overlaps with the timing of the power stroke of cylinder #6.

Since the exhaust stroke of one first cylinder will overlap with the power stroke of a second cylinder, the exhaust cam of the first cylinder may be operatively connected (via master pistons 30, 32 and slave piston 35) to cause early exhaust valve opening (during the power stroke) of the second cylinder. Therefore, in order to effect early exhaust valve opening to produce hotter exhaust gases, the exhaust cam of each cylinder will be selectively and/or temporarily configured to actuate a master piston 30, 32. Since, as described above with reference to FIG. 3, the exhaust stroke of each cylinder will overlap with the power/expansion stroke of at least one other cylinder, the master cylinder will be selected such that the master cylinder is the cylinder having an exhaust stroke overlapping in time with the power stroke of the slave cylinder. Therefore, when early valve opening during an engine expansion stroke is desired for a six-cylinder engine, cylinder #4 will be selected as the master for cylinder #1, cylinder #6 will be selected as the master for cylinder #2, cylinder #2 will be selected as the master for cylinder #4, cylinder #5 will be selected as the master for cylinder #3, cylinder #2 will be selected as the master for cylinder #4, cylinder #1 will be selected as the master for cylinder #5, and cylinder #3 will be selected as the master for cylinder #6. Because the timing of the expansion stroke of the slave cylinder overlaps with the timing of the exhaust stroke of the master cylinder, the exhaust cam lobe of each master cylinder will cause the hydraulic valve actuation system that controls opening and closing of the slave cylinder valves to open the slave exhaust valve during the power stroke of the selected slave valve and during the exhaust stroke of the selected master cylinder.

Further, it should be understood that the exhaust cam lobe of selected master cylinders may be configured to causing opening of associated exhaust valves at a range of suitable stroke cycle positions. For example, although the exhaust stroke of cylinder #4 begins at bottom-dead-center (BDC) the exhaust lobe of cylinder #4 may be configured to cause exhaust valve opening at a range of times before BDC. In addition, since this range of times will overlap with the power stroke of cylinder #1, the exhaust cam of cylinder #4, when acting to control master piston 30, will be able to cause opening of an exhaust valve (via slave piston 35) at a range of times. For example, during an early exhaust valve opening mode, slave exhaust valve 34 may be configured to open at TDC, between about 20 degrees and about 40 degrees after TDC, between about 20 degrees and about 60 degrees after TDC, or at any other suitable time to produce desired exhaust temperature.

As noted previously, selected master cylinders will control the valve timing of one or more slave cylinder exhaust valves by activating a hydraulic valve actuation system. Further, valve actuation system 24 can include master cylinder selection control mechanism 38 to alternatively select master cylinders that will allow valve timing that will produce hot exhaust gases, will allow machine braking, or will be selected as a normal machine timing mode configured to optimize performance parameters such as power output and/or fuel efficiency.

Typically, a hydraulic control system may have several components, including, for example, an accumulator 44, a relief valve 46, a spill valve 48, and a check valve 50. When a selected cam lobe 26, 28 is in an appropriate position corresponding to desired engine timing events, the cam lobe will provide cause displacement to one or more hydraulic pistons 30, 32 thereby activating an associated slave piston 35, and opening an exhaust valve 34 operatively connected with slave piston 35. Master cylinder selection control mechanism 38 will select desired master and slave cylinders by opening associated spool valves 40, 42 to fill a fluid circuit that operatively connects a master cylinder with a selected slave cylinder. When a selected cylinder is in a hot exhaust gas producing mode (i.e. having early exhaust valve opening during cylinder expansion) the exhaust lobe-driven master cam 26 causes hydraulic fluid to be pushed out of the master-slave fluid circuit through spill valve 48. Alternatively, when a selected cylinder is in a braking mode (i.e. having early exhaust valve opening during cylinder compression and before TDC) the injector lobe-driven master cam 28 causes hydraulic fluid to be pushed out of the master-slave fluid circuit through spill valve 48.

When it is desired to open a selected slave cylinder exhaust valve, the spill valve is closed with a fast actuator (not shown) that may be controlled by ECU 16 or additional electrical control units. Closing the spill valve causes check valve 50 to shut, thereby starting opening of the exhaust valve. This control mechanism can provide an additional level of control over valve timing so that the valve timing can be more finely tuned to produce desired exhaust temperatures.

Once the slave cylinder exhaust valve reaches a predetermined maximum lift, the valve hits a stop. At this point, the master cam lobe will still be moving and pushing oil into the fluid circuit. Therefore, the additional oil is displaced into accumulator 44 that is set at a pressure above the exhaust valve opening pressure, and relief valve 46 prevents excess pressure build up within the system. Finally, the end of the valve opening can be controlled by reopening the spill valve or waiting for the master cam to retract and withdraw the fluid.

As noted previously, early exhaust valve opening during an engine expansion stroke can produce relatively hot exhaust gases. In some embodiments, ECU 16 may be configured to monitor various machine operating parameters and to select a hot exhaust gas early valve opening mode only when needed. Further, ECU 16 may switch to a different machine operating mode by controlling the operation of master cylinder selection control mechanism 38 or by otherwise controlling the operation of hydraulic fluid control system 43, such as spill valve 48, and/or pump 37.

In some embodiments, ECU 16 may be configured to select a hot exhaust gas valve timing when DPF regeneration is needed. ECU 16 may determine that DPF regeneration is needed in a number of ways. For example, ECU 16 may periodically select a DPF regeneration mode after preselected time intervals or periods of machine operation. Alternatively or additionally, the need for DPF regeneration may be determined by monitoring various exhaust system parameters. For example, a pressure drop across a DPF that exceeds a preset limit may indicate that DPF regeneration is needed. Any suitable method for identifying a need for DPF regeneration may be selected as is known in the art.

In addition, ECU 16 may select a hot exhaust gas producing mode in order to control the temperature of one or more catalysts or other exhaust system components. For example, after a cold engine start, ECU 16 may select a early valve opening mode to more rapidly heat one or more catalysts to a more optimum temperature range. Further, it will be understood that a hot exhaust gas mode may be selected any time it is desired to heat exhaust system components, including for example, during cold ambient operating conditions.

ECU 16 may further be configured to select another valve timing mode once hot exhaust gas production is no longer needed or when a higher priority operation is needed. For example, once DPF regeneration or catalyst heating is complete, ECU 16 may select a valve timing to produce desired power output and/or fuel efficiency. Further, in some embodiments, ECU 16 may be configured to determine if and when another valve timing mode having a higher priority than hot exhaust gas production is desired, and to select the higher priority timing even though hot exhaust gas production may be desirable. For example, generally, when truck braking is needed, it is needed almost immediately, and therefore, ECU 16 may be configured to selected a vehicle braking mode over a hot exhaust gas mode. Further, in some situations, such as uphill driving, it may be more important to maintain adequate power output and/or fuel efficiency than to immediately start DPF regeneration or catalyst heating. In such situations, ECU 16 may be configured to select a valve timing that will produce a desired power output and/or fuel efficiency and to delay hot exhaust gas production until power output, fuel efficiency, and/or braking are less important than DPF regeneration.

Finally, it will be understood that although the valve actuation system of the present disclosure may be used to effect braking or exhaust system heating, other components may be used in conjunction with the valve actuation system to facilitate these operations. For example, all highway trucks will be expected to use conventional mechanical brakes in conjunction with the valve actuation system of the present disclosure. Further, other exhaust system heating components may be included with machine 10. Such heating components can include, for example, a combustion burner for DPF regeneration and/or various catalyst heating systems. These systems may be used when the valve actuation system cannot produce appropriate valve timing because other machine operations are considered a higher priority. Additionally, such systems may be selected if adequate heating cannot be accomplished through valve timing alone.

INDUSTRIAL APPLICABILITY

The present disclosure provides a valve actuation system for use with internal combustion engines. The valve actuation system may be used to control valve timing for any suitable machine, including highway trucks or off-highway vehicles.

The valve actuation system of the present disclosure can include a master-slave system, whereby the valve timing of one engine event is tied to the timing of another engine event. For example, in one embodiment, the exhaust cam of a first cylinder acts as a master to control the exhaust valve opening of a second cylinder. Further, the first cylinder exhaust cam may be selected such that the exhaust cam will cause the exhaust valve of the second cylinder to open relatively early during an engine expansion stroke. The early valve opening will cause exhaust gas that is not fully expanded and is therefore hotter than fully-expanded exhaust gas to be released into an engine exhaust system.

Heating of exhaust gases by early valve opening can be used to facilitate a number of machine operations. For example, hot exhaust gases may be used to regenerate diesel particulate filters. Further, control of exhaust temperature can be used to control catalyst operation. For example, more rapid heating of a catalyst after a cold start may allow efficient catalyst operation shortly after initiation of machine operation. In addition, it may be desirable to control the temperature of any catalyst to maintain the catalyst within a desired temperature range, thereby controlling the catalyst operation.

In other embodiments, the valve actuation system of the present disclosure can include a valve timing system configured to effect vehicle braking. For example, in one embodiment, a cylinder injector cam may act as a master to control the exhaust valve opening timing of the same cylinder. In some embodiments, the system may be configured to effect exhaust valve opening before cylinder top dead center. Early exhaust valve opening during an engine braking mode will cause a negative power output and help slow a vehicle such as a highway truck. Further, in some embodiments, the valve actuation system of the present disclosure can include a master selection mechanism that will allow selection of valve timing to facilitate exhaust gas heating or braking only when desired.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. An internal combustion engine, comprising:
   first and second engine cylinders each of which includes:
   an intake valve configured to control air-flow into its respective cylinder; and
   an exhaust valve configured to control the flow of exhaust gases out of its respective cylinder,
   an exhaust cam lobe configured to selectively control the valve timing of the exhaust valve of the first cylinder and to cause the exhaust valve of the second cylinder to open during an expansion stroke of the second cylinder after at least partial combustion has taken place in the second cylinder.

2. The engine of claim 1, further including a hydraulic piston operatively connected to the exhaust cam lobe such that the hydraulic piston is activated by the exhaust cam lobe to cause the exhaust valve of the second cylinder to open during an expansion stroke of the second cylinder.

3. The engine of claim 1, wherein at least one of the first and second engine cylinder includes an injector cam lobe configured to selectively control the injection timing of at least one of the first and second engine cylinders and to cause the exhaust valve of at least one of the first and second engine cylinders to open before top dead center.

4. The engine of claim 3, further including a hydraulic piston operatively connected to the injector cam lobe such that the hydraulic piston is displaced by the injector cam lobe to cause the exhaust valve of the at least one of the fist and second engine cylinders to open before top dead center.

5. The engine of claim 4, further including a hydraulic piston operatively connected to the exhaust cam lobe such that the hydraulic piston is displaced by the exhaust cam lobe to cause the exhaust valve of the second cylinder to open during an expansion stroke of the second cylinder.

6. The engine of claim 5, further including a cylinder master selection system configured to selectively control the flow of hydraulic fluid to a hydraulic piston operatively connected to the injector cam lobe and the hydraulic piston operatively connected to the exhaust cam lobe to couple and decouple the hydraulic pistons from the cylinder exhaust valves.

7. The engine of claim 6, wherein the master cylinder selection system includes at least one spool valve.

8. A method for controlling engine valve timing, comprising:
   operating an engine including two or more engine cylinders, each cylinder including:
   at least one intake valve configured to control air-flow into each of the two or more cylinders; and
   at least one exhaust valve configured to control the flow of exhaust gases out of each of the two or more cylinders;
   selecting an exhaust cam lobe of at least one first cylinder wherein the at least one first cylinder has an exhaust stroke timing that overlaps with the power stroke of at least one second cylinder; and
   opening the at least one exhaust valve of the at least one second cylinder by coupling the exhaust valve of the at least one second cylinder to the exhaust cam lobe of the at least one first cylinder such that the exhaust valve opens during a power stroke of the at least one second cylinder to release exhaust gas from the second cylinder.

9. The method of claim 8, wherein coupling the exhaust valve of the at least one second cylinder to the exhaust cam lobe of the at least one first cylinder includes operatively connecting a hydraulic piston to the at least one first cylinder exhaust cam lobe such that the hydraulic piston is displaced by the at least one first cylinder exhaust cam lobe to cause the exhaust valve of the second cylinder to open during an expansion stroke of the second cylinder.

10. The method of claim 8, further including selecting at least one engine cylinder injector cam lobe configured to selectively control the injection timing of the cylinder; and
   opening the exhaust valve of the same cylinder by coupling the injector cam lobe to the exhaust valve of the same cylinder such that the exhaust valve opens before top dead center of a compression stroke of the same cylinder.

11. The method of claim 10, wherein coupling the injector cam lobe to an exhaust valve of the cylinder includes operatively connecting a hydraulic piston to the at least one engine cylinder injector cam lobe such that the hydraulic piston is displaced by the at least one cylinder intake cam lobe to cause the exhaust valve of the cylinder to open before top dead center.

12. An engine having an exhaust system heating and machine braking system, comprising:
   two or more engine cylinders each including:
   at least one intake valve configured to control air-flow into each of the two or more cylinders; and
   at least one exhaust valve configured to control the flow of exhaust gases out of each of the two or more cylinders;
   wherein the at least one first cylinder includes an exhaust cam lobe configured to selectively control the valve timing of an exhaust valve of the at least one first cylinder and to cause an exhaust valve of a second cylinder to open during an expansion stroke of the second cylinder for timing the release of exhaust gas; and a machine electrical control system configured to couple and decouple the exhaust cam lobe of the at least one cylinder and the exhaust valve of the second cylinder to activate and deactivate an early exhaust valve timing mode.

13. The engine of claim 12, further including a hydraulic piston operatively connected to the at least one first cylinder exhaust cam lobe such that the hydraulic piston is displaced by the at least one first cylinder exhaust cam lobe to cause the exhaust valve of the second cylinder to open during an expansion stroke of the second cylinder.

14. The engine of claim 12, wherein at least one engine cylinder includes an injector cam lobe configured to selectively control the injection timing of the cylinder and to cause the exhaust valve of the same at least one engine cylinder to open before top dead center.

15. The engine of claim 14, further including a hydraulic piston operatively connected to the at least one engine cylinder injector cam lobe such that the hydraulic piston is displaced by the at least one cylinder injector cam lobe to cause the exhaust valve of the second cylinder to open before top dead center.

16. The engine of claim 15, further including a hydraulic piston operatively connected to the at least one engine cylinder exhaust cam lobe such that the hydraulic piston is displaced by the at least one cylinder exhaust cam lobe to cause the exhaust valve of the second cylinder to during an expansion stroke of the second cylinder.

17. The engine of claim 16, further including a cylinder master selection system configured to selectively control the hydraulic piston operatively connected to the at least one engine cylinder injector cam lobe and the hydraulic piston operatively connected to the at least one engine cylinder exhaust cam lobe to couple and decouple the hydraulic pistons from the cylinder exhaust valves.

* * * * *